(12) United States Patent
Mahamkali (10) Patent No.: US 11,330,461 B2
(45) Date of Patent: May 10, 2022

(54) COOPERATIVE ACCESS POINTS FOR QUALITY OF SERVICE (QOS) REQUIREMENTS IN WIRELESS LOCAL ACCESS NETWORKING (WLAN)

(71) Applicant: Fortinet, Inc., Sunnyvale, CA (US)

(72) Inventor: Ravikiran Mahamkali, Ulsoor (IN)

(73) Assignee: Fortinet, Inc., Sunnyvale, CA (US)

( * ) Notice: Subject to any disclaimer, the term of this patent is extended or adjusted under 35 U.S.C. 154(b) by 0 days.

(21) Appl. No.: 16/586,066

(22) Filed: Sep. 27, 2019

(65) Prior Publication Data
US 2021/0099907 A1   Apr. 1, 2021

(51) Int. Cl.
| | | |
|---|---|---|
| *H04W 28/02* | (2009.01) | |
| *H04W 28/08* | (2009.01) | |
| *H04W 28/24* | (2009.01) | |
| *H04W 84/12* | (2009.01) | |
| *H04L 12/851* | (2013.01) | |
| *H04L 12/873* | (2013.01) | |
| *H04L 47/2441* | (2022.01) | |
| *H04L 47/52* | (2022.01) | |

(52) U.S. Cl.
CPC ..... *H04W 28/0268* (2013.01); *H04L 47/2441* (2013.01); *H04L 47/522* (2013.01); *H04W 28/08* (2013.01); *H04W 28/24* (2013.01); *H04W 84/12* (2013.01)

(58) Field of Classification Search
CPC . H04W 28/0268; H04W 28/08; H04W 28/24; H04W 84/12; H04L 47/2441; H04L 47/522
See application file for complete search history.

(56) References Cited

U.S. PATENT DOCUMENTS

| | | | |
|---|---|---|---|
| 2003/0142651 A1* | 7/2003 | Matta | H04W 28/24 370/338 |
| 2007/0160017 A1* | 7/2007 | Meier | H04W 36/18 370/338 |
| 2009/0191858 A1* | 7/2009 | Calisti | H04L 47/824 455/422.1 |
| 2016/0309379 A1* | 10/2016 | Pelletier | H04W 76/12 |
| 2018/0199398 A1* | 7/2018 | Dao | H04L 67/142 |
| 2020/0314701 A1* | 10/2020 | Talebi Fard | H04W 36/0033 |

* cited by examiner

*Primary Examiner* — Jianye Wu
(74) *Attorney, Agent, or Firm* — Law Office of Dorian Cartwright; Dorian Cartwright (57) ABSTRACT

For QoS (quality of service) requirements of a session at a first access point and a wireless station, a cost function value is calculated for the specific session based on a number of network packets to be processed in the queue and the identified QoS requirement. It is determined whether another of the plurality of access points within range of the specific session can better serve the identified QoS requirement than the first access point by comparing the cost function value for the specific session against the first access point against at least a cost function value for a second access point.

9 Claims, 7 Drawing Sheets

COOPERATIVE ACCESS POINTS FOR QUALITY OF SERVICE (QOS) REQUIREMENTS IN WIRELESS LOCAL ACCESS NETWORKING (WLAN)

FIELD OF THE INVENTION

The invention relates generally to computer networking, and more specifically, to improving network hardware performance by selectively offloading network packets to cooperating access points to meet quality of service (QoS) standards.

BACKGROUND

Wi-Fi multimedia (WMM) is a Wi-Fi Alliance interoperability certification, based on the IEEE 802.11e standard, promulgated by the Institute of Electrical and Electronics Engineers. It provides basic QoS features to IEEE 802.11 networks. WMM prioritizes traffic according to four Access Categories (AC): voice (AC_VO), video (AC_VI), best effort (AC_BE), and background (AC_BK). It is suitable for well-defined applications that require QoS, such as Voice over IP (VoIP) on Wi-Fi phones (VoWLAN).

One problem with the current QoS paradigm is that applications with high priority will be getting the Tx opportunity very quickly, due to a small TxOp value and can easily win the contention process, so that better service is provided to voice and video. Suppose there are many devices using the voice/video applications continuously in one access point coverage area, there is a huge possibility that, the less priority jobs starved for longer times, though not indefinitely. Sometimes the applications falling under low priority queues, may be affected in a bigger way, if they have any time-out period. In this way, WMM QoS mechanism does not provide guaranteed throughput What is needed is a robust technique to providing cooperative access points for QoS requirements in WLANs.

SUMMARY

To meet the above-described needs, methods, computer program products, and systems for load balancing QoS requirements across multiple access points.

In one embodiment, one or more network packets for a specific session of network packets are received from a station to an access point, and a QoS required by the session of network packets is identified.

In some embodiments, a cost function value is calculated for the specific session based on a number of network packets to be processed in the queue and the identified QoS requirement. It is determined whether another of the plurality of access points within range of the specific session can better serve the identified QoS requirement than the first access point by comparing the cost function value for the specific session against at the first access point against at least a cost function value for a second access point.

In another embodiment, the specific session is handed off from the first access point to the second access point responsive to the second access point being able to better serve the identified QoS requirement.

Advantageously, network performance is improved with better performance towards QoS requirements. Additionally, network computer hardware performance, and network performance, are improved within more efficient processing of network packets.

BRIEF DESCRIPTION OF THE DRAWINGS

In the following drawings, like reference numbers are used to refer to like elements. Although the following figures depict various examples of the invention, the invention is not limited to the examples depicted in the figures.

DETAILED DESCRIPTION

Methods, computer program products, and systems for load balancing QoS requirements across multiple access points, are described. The techniques can be applied to WMM sessions of network traffic, IEEE 802.11e session of network traffic, and others.

Systems for Load Balancing QoS Requirements Across Multiple Access Points (FIGS. 1-4)

Figure 1A:
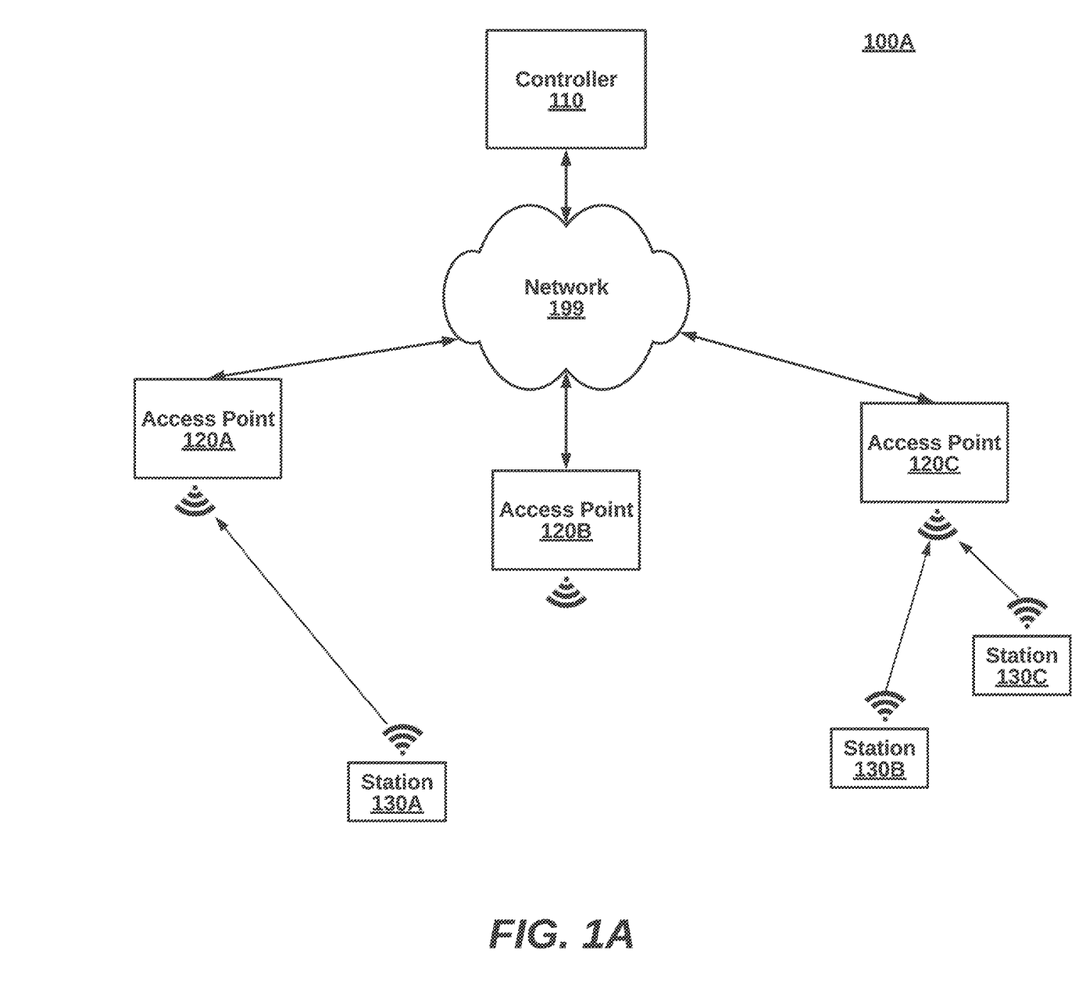
FIGS. 1A & 1B are high-level block diagrams illustrating a system handoff for load balancing QoS requirements across multiple access points, according to one embodiment.
Figure 1B:
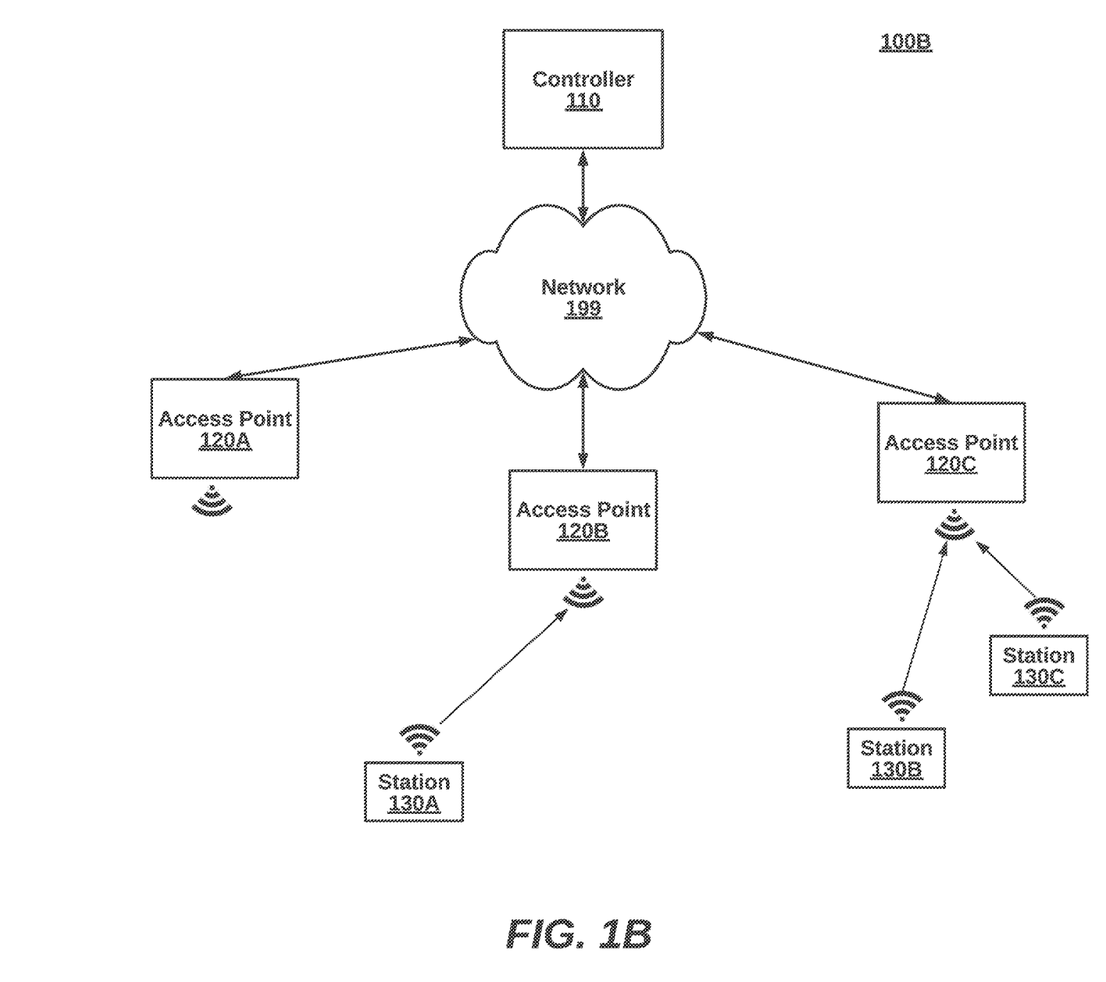

FIG. 1 is a high-level block diagram illustrating a system for load balancing QoS requirements across multiple access points, according to one embodiment. The system 100 includes a Wi-Fi controller 110, access points 120A-C, and stations 130A-C. Other embodiments of the system 100 can include additional network components that are not shown in FIG. 1. For example, there can be more access points and more stations. There can also be network devices such as switches, routers, fire walls, proxy servers, and other network architectures.

In one embodiment, the Wi-Fi controller 110 is preferably connected by wire to the network 199. The access points 120A-C are also preferably connected by wire to the network 199 and connected wirelessly to the stations 130A-C. The network 199 can comprise a data communication network such as the Internet, WAN (wide area network), VLAN (virtual local access network), a LAN (local access network), a cellular network (e.g., 3G, 4G or 5G), or a hybrid network.

The Wi-Fi controller 110 conducts handoffs between access points responsive to cost function values for processing sessions of network packets (e.g., WMM sessions or IEEE 802.11e sessions). In one embodiment, all sessions are evaluated for cost function value and sent to the most available access point. In another embodiment, access points handle QoS requirements for native sessions, until a threshold is surpassed, thereby activating load balancing. In still another embodiment, sessions are handed off to other access points by disassociating a session from the BSSID and associating the session with a different access point that can better serve the session. Most examples herein refer to per-session load balancing, but examples can also refer to combinations of sessions or just partial sessions.

In one embodiment, the Wi-Fi controller 110 activates a load balancing mode when triggered and deactivates the load balancing mode when triggered in the other direction. In one example, when a ratio of sessions becomes overrepresented by high priority sessions at a single access point, load balancing can be activated until the ratio drops. Further, load balancing can be activated in a subset of the total available access points. In addition, load balancing can be tempered by parameters such as signal strength, channel interference, connection history, number of connected stations, traffic load, and the like.

The Wi-Fi controller 110 can also provide other functions such as virtual cell or virtual port. With respect to virtual cell, all access points of a WLAN share the same SSID so that any of the access points can respond to a particular station as it moves around the WLAN. With respect to virtual port, the particular station has a unique SSID that moves from a first access point to a second access point, during a handoff.

The Wi-Fi controller 110 can be, for example, an MC1500 or MC6000 device by Fortinet, Inc. of Sunnyvale, Calif. The controller is set forth in more detail below with respect to FIG. 2.

The access points 120A-C process packets according to QoS requirements. As described in the IEEE 802.11e network protocol, there are four QoS priority categories: voice, video, best effort and background. A communication interface of the access points 120A-C receive network packets for processing, downstream to Wi-Fi stations or upstream to Internet destinations. The network packets are temporary stored in one or more queues while awaiting processing. In some embodiments, the queues are random access memory devices. To implement priority, the access points 120A-C use a smaller TxOP window for higher priority categories in order to provide better contention to the channel. In one example, voice packets have a TxOP value of 1 microsecond, video packets 2 microseconds, best effort packets 3 microseconds, and background packets 4 microseconds. QoS cost function is calculated, in one implementation, by the number of packets times the TxOP. If 900 packets are stored in the Best Effort queue, the resulting QoS cost function would be 900×3=2700 microseconds.

Figure 7:
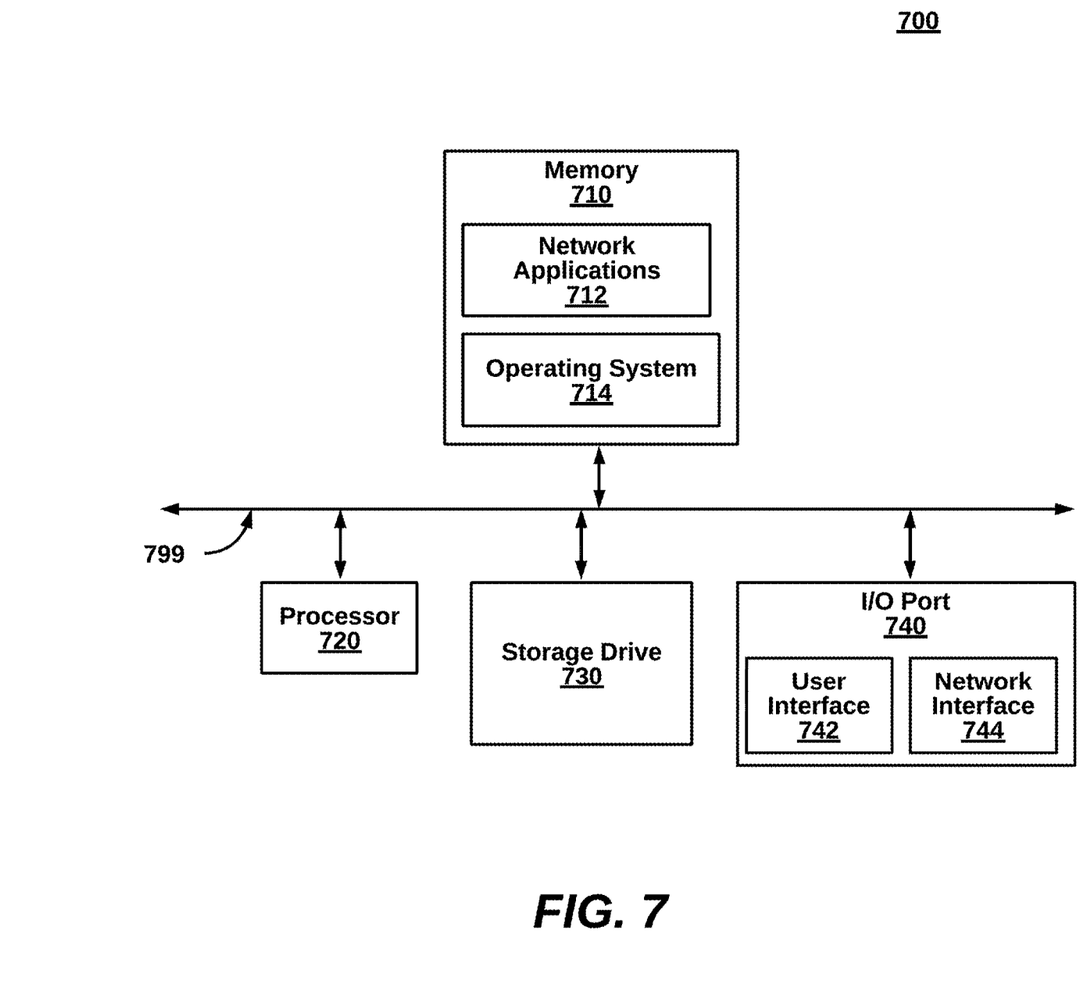
FIG. 7 is a block diagram illustrating an exemplary computing device, according to one embodiment.

The access points 120A-C can be any of the computing devices, such as a personal computer, a server blade, any computing environment as shown in FIG. 7. For example, the AP 101 can be an Access Point—Model 101 or an Access Point—Model 433 (modified as discussed herein) by Fortinet, Inc. The access points 120A-C are described in more detail in association with FIG. 4.

The stations 130A-C (or mobile station, STA, client or wireless device) 102 can be, for example, a personal computer, laptop computer, tablet computer, smart phone, mobile computing device, Internet appliance, end station or any other computing device as described in FIG. 7. Station 102 is wirelessly couples to APs using a radio and antenna. No pre-configuration or client is needed. The station 102 operates according to wireless standards such as IEEE 802.11a, b, g, n, ac, w or any other wireless standard. The station 102 sends and/ or receives network packets for applications being executed.

Figure 2:
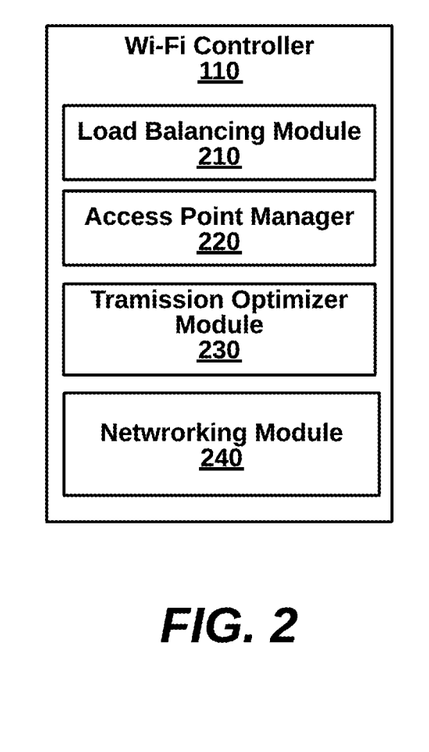
FIG. 2 is a more detailed block diagram illustrating a Wi-Fi controller of the system of FIG. 1, according to one embodiment.

FIG. 2 is a more detailed block diagram illustrating the Wi-Fi controller 110 of the system of FIG. 1, according to one embodiment. The Wi-Fi controller 110 includes a load balancing module 210, an access point management module 220, an operating system 230, and connection ports 240. The components can be implemented in hardware, software, or a combination of both.

Figure 3:
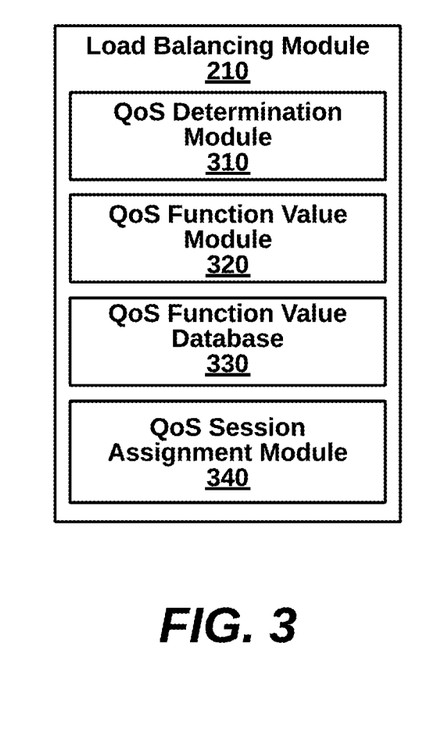
FIG. 3 is a more detailed block diagram illustrating an example load balancing module of the Wi-Fi controller of FIG. 2, according to one embodiment.

The load balancing module 210 determines when sessions should be handed off due to QoS requirements compared against a current access point and other available access points. FIG. 3 shows an example detail of the load balancing module 210. A QoS determination module 310 identifies QoS requirements of sessions. A QoS function value module 320 calculates real-time demands for the session at the current access point and other available access points. The QoS function value database 330 stores threshold values for QoS function values, as automatically or manually determined. A QoS session assignment module identifies a best serving access point and whether a threshold has been crossed to trigger a handoff.

The station management module 220 manages station connections by advertising beacons, receiving probe request, sending probe responses and other management frames. Further, individual stations can be tracked as to bandwidth usage, QoS, BSSID assignment, and the like. Beacons and probe responses can also be modified by the station management module 112 to include channel switch announcement information The operating system 230 interfaces between the software and hardware of the AP 101. The operating system 114 can also include integrated applications.

The networking module 240 includes connection ports and networking hardware and software for exchanging network packets over the channel.

Figure 4:
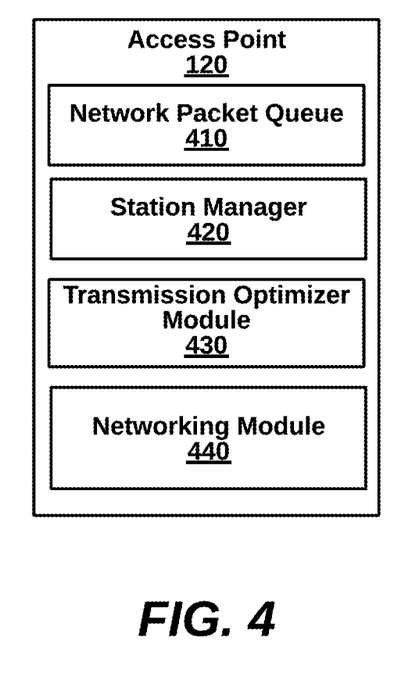
FIG. 4 is a more detailed block diagram illustrating an example access point of the system of FIG. 1, according to one embodiment.

FIG. 4 is a more detailed block diagram illustrating an example access point 120 (representative of any of 120A-C) of the system of FIG. 1, according to one embodiment. The access point 120 includes a load balancing client 410 to communicate with a controller. Data can be sent upstream to a controller and commands for execution can be received. The load balancing client 410 calculates cost function values for new sessions to determine whether or not the access point 120 should service the session or hand off to another access point (e.g., number of packets in a particular queue multiplied by a transmission opportunity window, TxOP). The cost function protects overworking the processor, queue or other hardware of the access point 120. For example, in one embodiment, a processor load of the access point 120 is checked before increasing an amount of locally handled packets. A large number of hand offs may be detected, and artificial intelligence can dynamically reduce the threshold level for the cost function value. If the processor load is high, the threshold level can be maintained or even increased to reduce the processor load. On the other hand, if the processor load is relatively low, then a threshold can be lowered for the cost function value. In one implantation, the cost function value is implemented by a hash.

A station manager 420 manages connections with stations on the Wi-Fi and sends beacons to advertise service of the access point 120. In more detail, station management module 420 manages station connections by advertising beacons, receiving probe request, sending probe responses and other management frames. Further, individual stations can be tracked as to bandwidth usage, QoS, BSSID assignment, and the like.

A network packet queue 430 stores network packets of sessions received for processing. The network packet queue 430 stores network packets received from the data communication network for either upstream or downstream transmission. The network packets can be pre-processed to determine QoS priority requirements, and in some embodiments there are dedicated queues for each QoS requirements. More specifically, there is a voice packet queue, a video packet queue, a best effort packet queue, and a background packet queue. The network packet queue 430 can be implemented in any appropriate storage or memory device.

An operating system 440 can provide current loads for processors, memories and other access point data to be considered in QoS offloading. A processor 450 executes instructions from microcode during packet processing. Different threshold levels can be set for the processor 450 and other packet processing resources. For example, a processor load below 75% usage can be required in order to take on additional QoS requirements.

A networking module 460 can include transceivers and antenna for Wi-Fi or other wireless connectivity in addition to wired connectivity. The components can be implemented in hardware, software, or a combination of both.

Figure 5:
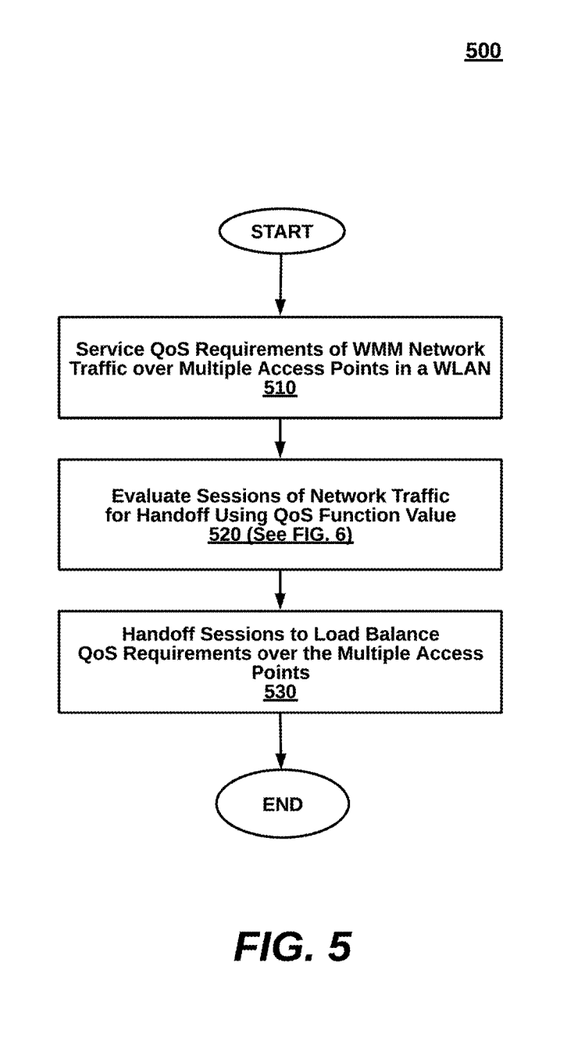
FIG. 5 is a high-level flow diagram illustrating a method for load balancing QoS requirements across multiple access points, according to one embodiment.
Figure 6:
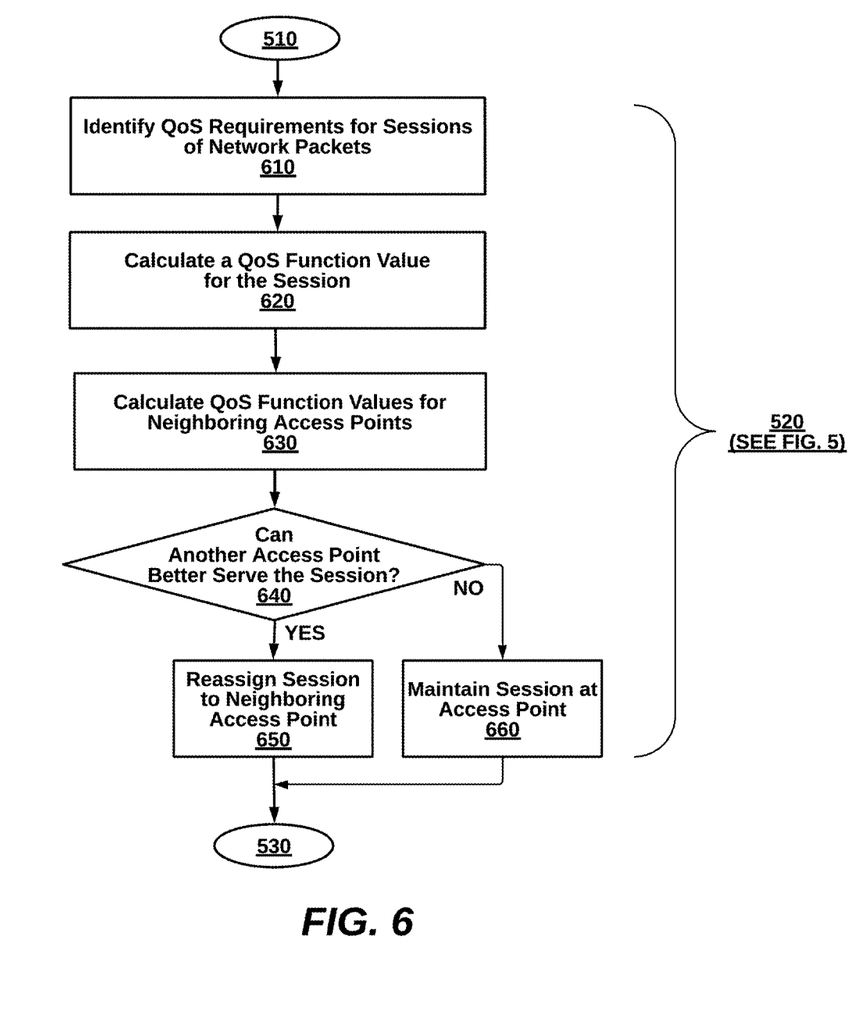
FIG. 6 is a more detailed flow diagram illustrating a step of evaluating sessions of network traffic, from the method of FIG. 5, according to one embodiment.

Methods for Load Balancing QoS Requirements Across Multiple Access Points (FIGS. 5-6)

FIG. 5 is a high-level flow diagram illustrating a method 500 for load balancing QoS requirements across multiple access points, according to one embodiment. The method 500 can be implemented by, for example, a Wi-Fi controller (e.g., Wi-Fi controller 110 of FIG. 1A).

At step 510, QoS requirements are serviced for WMM network traffic at a first access point of multiple access points in a WLAN. The network packets can be processed according to one of four categories in an embodiment, voice, video, best effort and background. In other embodiments, other categories are possible.

At step 520, sessions of network traffic are evaluated for handoff using QoS function values by a controller and/or the first access point. If a neighboring access point can better serve the session, a handoff may occur. A detailed example of step 520 is set forth with respect to FIG. 6

At step 530, sessions are handed off to load balance QoS requirements over the multiple access points. As a result, processing resources can be conserved at the first access point in order to continue meeting QoS demands of sessions already active. For example, processing power, available queue memory and current throughput can be protected by handing off new sessions.

FIG. 6 is a more detailed flow diagram of the evaluating sessions of network traffic step 520, from the method 500 of FIG. 5, according to one embodiment .

At step 610, QoS requirements are identified for session of network packets. In one example, QoS is extracted from network packets of a session. In another example, an application sends QoS information directly. In yet another example, QoS can be automatically applied based on, for instance, a type of application, connection history of a specific application, connection history of a specific device, connection history of a specific user, or available QoS bandwidth of the first access point or the second access point.

At step 620, a QoS function value is calculated for the session. At step 630, QoS function values are calculated for neighboring access points. Many different handoff evaluation algorithms can be implemented. In one case, each session is evaluated for its category of QoS in relation to a queue of network packets awaiting processing in the same category. In one embodiment, QoS function value is calculated in real-time responsive to a new session. In other embodiment, QoS function values for each access point is maintained by a controller for faster application.

At step 640, if another access point can better serve the session, the session is reassigned to a neighboring access point, at step 650. On other hand, if another access point is not identified, at step 640, then at step 660, the session is maintained at the current access point.

In an alternative embodiment, additional conditions are implemented at steps 650 and 660. A processing load can be considered in step 650 in that the reassignment will not occur if there is a low enough processing load for the current QoS requirements. Similarly, in step 660, a reassignment can supersede the decision to maintain session at current access point if the processing load is already to high for the current QoS load. In other words, QoS function values can help network hardware performance, and in turn network performance, by setting QoS function values as a quick predictor of resource loads. In some cases, the additional step of confirming the resource load can supersede the QoS analysis results.

Generic Computing Device (FIG. 7)

FIG. 7 is a block diagram illustrating an exemplary computing device 700 for use in the system 100 of FIG. 1, according to one embodiment. The computing device 700 is an exemplary device that is implementable for each of the components of the system 100, including the controller 110, the access point 120 and the stations 130A-C. Additionally, the computing device 700 is merely an example implementation itself, since the system 100 can also be fully or partially implemented with laptop computers, tablet computers, smart cell phones, Internet appliances, and the like.

The computing device 700, of the present embodiment, includes a memory 710, a processor 720, a hard drive 730, and an I/O port 740. Each of the components is coupled for electronic communication via a bus 750. Communication can be digital and/or analog, and use any suitable protocol.

The memory 710 further comprises network applications 712 and an operating system 714. The network applications 720 can include the modules of network applications or APs as illustrated in FIGS. 2-4. Other network applications can include 712 a web browser, a mobile application, an application that uses networking, a remote application executing locally, a network protocol application, a network management application, a network routing application, or the like.

The operating system 714 can be one of the Microsoft Windows® family of operating systems (e.g., Windows 97, 98, Me, Windows NT, Windows 2000, Windows XP, Windows XP x74 Edition, Windows Vista, Windows CE, Windows Mobile, Windows 7 or Windows 10), Linux, HP-UX, UNIX, Sun OS, Solaris, Mac OS X, Alpha OS, AIX, IRIX32, or IRIX74. Other operating systems may be used. Microsoft Windows is a trademark of Microsoft Corporation.

The processor 720 can be a network processor (e.g., optimized for IEEE 702.11), a general-purpose processor, an application-specific integrated circuit (ASIC), a field programmable gate array (FPGA), a reduced instruction set controller (RISC) processor, an integrated circuit, or the like. Qualcomm Atheros, Broadcom Corporation, and Marvell Semiconductors manufacture processors that are optimized for IEEE 702.11 devices. The processor 720 can be single core, multiple core, or include more than one processing elements. The processor 720 can be disposed on silicon or any other suitable material. The processor 720 can receive and execute instructions and data stored in the memory 710 or the hard drive 730.

The storage device 730 can be any non-volatile type of storage such as a magnetic disc, EEPROM, Flash, or the like. The storage device 730 stores code and data for applications.

The I/O port 740 further comprises a user interface 742 and a network interface 744. The user interface 742 can output to a display device and receive input from, for example, a keyboard. The network interface 744 connects to a medium such as Ethernet or Wi-Fi for data input and output. In one embodiment, the network interface 744 includes IEEE 802.11 antennae.

Many of the functionalities described herein can be implemented with computer software, computer hardware, or a combination.

Computer software products (e.g., non-transitory computer products storing source code) may be written in any of various suitable programming languages, such as C, C++, C#, Oracle® Java, JavaScript, PHP, Python, Perl, Ruby, AJAX, and Adobe® Flash®. The computer software product may be an independent application with data input and data display modules. Alternatively, the computer software products may be classes that are instantiated as distributed objects. The computer software products may also be component software such as Java Beans (from Sun Microsystems) or Enterprise Java Beans (EJB from Sun Microsystems).

Furthermore, the computer that is running the previously mentioned computer software may be connected to a network and may interface to other computers using this network. The network may be on an intranet or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, and 802.ac, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

I claim:

1. A computer-implemented method in a controller device coupled to and managing a plurality of access points (APs) over a data communication network, for load balancing quality of service (QoS) packet processing based on processor performance, the method comprising:
   receiving, at a communication interface of the first access point, one or more network packets for a specific session of network packets from a station, from the data communication network;
   identifying a QoS required by the session of network packets;
   calculating a cost function value for the specific session based on a number of network packets to be processed in the queue and the identified QoS requirement;
   determining whether another of the plurality of access points within range of the specific session can better serve the identified QoS requirement than the first access point by comparing the cost function value for the specific session against at the first access point against at least a cost function value for a second access point; and
   responsive to the second access point being able to better serve the identified QoS requirement based on the cost function value for the second access point, handing off the specific session from the first access point to the second access point, wherein the handoff occurs despite the lower signal strength for low priority network packets.

2. The method of claim 1, further comprising:
   determining a dynamic threshold value;
   responsive to a number of handoffs within a predefined window exceeding a predetermined value, adjusting the dynamic threshold value.

3. The method of claim 2, further comprising:
   determining a processor load for the processor relative to an ideal processor load;
   wherein the adjustment of the dynamic threshold value is responsive to both the processor load and the number of handoffs within the predefined window exceeding the predetermined value.

4. The method of claim 1, wherein the identified QoS requirement is associated with at least one of: voice, video, best effort, and background.

5. The method of claim 1, further comprising:
   determining that the second access point has a lower signal strength relative to the specific session than the first access point,
   wherein the handoff occurs despite the lower signal strength for low priority network packets, the identified QoS requirement being associated with either best effort or background.

6. The method of claim 1, further comprising:
   recalculating the cost function value for the specific session after a predetermined length of time; and
   handing off the specific session if the second access point is now better able to service the identified QoS requirement.

7. The method of claim 1, wherein the specific session is associated with an application executing on the station, the application having a QoS requirement.

8. A non-transitory computer-readable medium storing instructions that, when executed by a processor, perform a computer-implemented method in a controller device coupled to and managing a plurality of access points (APs) over a data communication network, for load balancing quality of service (QoS) packet processing based on processor performance, the method comprising:
- receiving, at a communication interface of the first access point, one or more network packets for a session of network packets, from the data communication network;
- identifying a QoS required by the session of network packets;
- calculating a cost function value for the specific session based on a number of network packets to be processed in the queue and the identified QoS requirement;
- determining whether another of the plurality of access points can better serve the identified QoS requirement than the first access point by comparing the cost function value for the specific session against at the first access point against at least a cost function value for a second access point; and
- responsive to the second access point being able to better serve the identified QoS requirement based on the cost function value for the second access point, handing off the specific session from the first access point to the second access point, wherein the handoff occurs despite the lower signal strength for low priority network packets.

9. A controller device coupled to and managing a plurality of access points (APs) over a data communication network, for load balancing quality of service (QoS) packet processing based on processor performance, the controller device comprising:

- a processor;
- a communication interface of the first access point, communicatively coupled to the processor and to the data communication network, to receive the one or more network packets for a session of network packets, from the data communication network;
- a memory, storing source code for:
  - a QOS determination module to identify a QoS required by the session of network packets;
  - a QOS function value module to calculate a cost function value for the specific session based on a number of network packets to be processed in the queue and the identified QoS requirement; and
  - a QOS session assignment module to determine whether another of the plurality of access points can better serve the identified QoS requirement than the first access point by comparing the cost function value for the specific session against at the first access point against at least a cost function value for a second access point, and responsive to the second access point being able to better serve the identified QoS requirement based on the cost function value for the second access point, handing off the specific session from the first access point to the second access point, wherein the handoff occurs despite the lower signal strength for low priority network packets.

\* \* \* \* \*